Nov. 26, 1968 O. A. SHORT 3,413,240
COMPOSITIONS
Filed March 25, 1965
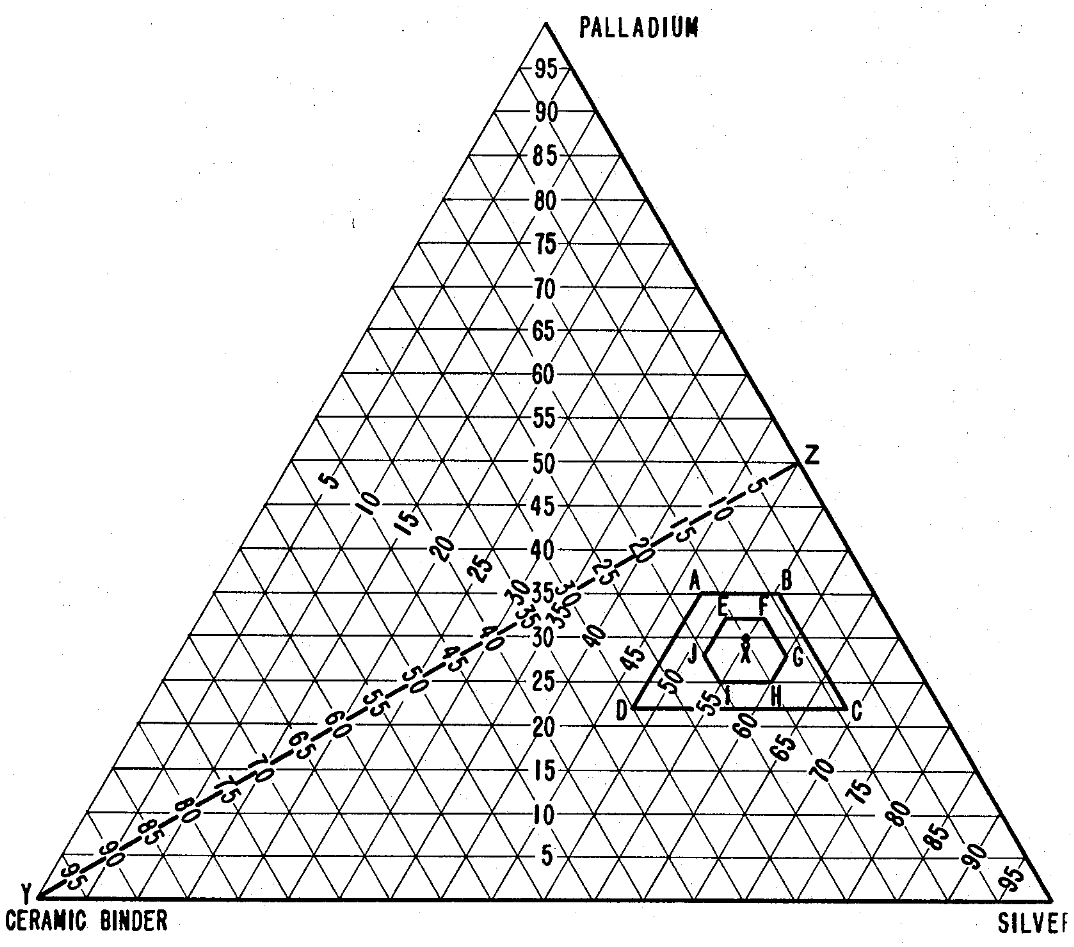
INVENTOR
OLIVER A. SHORT
BY Amos G. Cole
AGENT United States Patent Office
3,413,240
Patented Nov. 26, 1968

3,413,240
COMPOSITIONS

Oliver A. Short, Wilmington, Del., assignor to E. I. du Pont de Nemours and Company, Wilmington, Del., a corporation of Delaware Filed Mar. 25, 1965, Ser. No. 442,668
8 Claims. (Cl. 252—514)

ABSTRACT OF THE DISCLOSURE

Compositions suitable for the production of fired-on electrically conductive contacts to palladium-based resistor elements, said composition comprising, in critical proportionate amounts, (A) a substance in finely divided form from the group consisting of metallic palladium, palladium oxide, and palladium/silver alloys, (B) finely divided silver, and (C) finely divided ceramic binder.

This invention relates to improved compositions for the production of fired-on electrically conductive metal coatings, which compositions are particularly suited for use in preparing fired-on conductive contacts or connection with fired-on palladium-based resistors.

Palladium-based resistor compositions are widely used to prepare printed fired-on resistors on dielectric ceramic substrates. In use, such resistors must be connected electrically by conductor elements to other printed circuit components such as capacitors, transistors, diodes, etc., which components must be soldered together in place. The conductor elements must be good conductors, i.e., they must have low electrical resistance, they must adhere well to the ceramic substrate, and they must also be readily soldered. The usual conductive silver compositions which are employed extensively in forming fired-on printed circuit conductor elements for many purposes, are not suited for use in preparing fired-on conductive contacts or connections with fired-on palladium-based resistors, because in the area where the conductor and the resistor overlap, i.e., the overlap area, many bubbles, blisters, cracks, etc., are formed on firing. Because of this serious difficulty and also the problem of silver migration, platinum-gold conductor or connector compositions have been generally employed in preparing fired-on conductive contacts or connections to palladium-based resistors.

Resistor compositions of the type referred to above comprise a finely-divided palladium component and a finely-divided ceramic binder component, generally in the proportions of about 20 to 90% of the binder to 10 to 80% of the palladium component, based upon the combined weights of such two components, the mixture of which is generally applied to the dielectric ceramic substrate, e.g., by screen stencil printing, in the form of a pasty dispersion of the above components in an inert vehicle. The finely divided palladium component may be elemental palladium, palladium oxide or mixtures thereof; or, it may be a mixture of elemental palladium, palladium oxide or a mixture thereof with finely divided silver in suitable proportions. Alternatively, all or part of the palladium and silver, if both are present, may be in the form of a finely divided palladium/silver alloy of such composition as to give the desired over-all weight ratio of palladium to silver. Generally, the over-all weight ratio of palladium to silver will be at least 45:55, and most generally at least 50:50, counting the total Pd content of all palladium-bearing constituents present, e.g., metallic palladium, palladium oxide, palladium alloy, etc.

The term "palladium-based" resistor composition is used herein in the sense indicated above, i.e., to means resistor compositions of the above type in which the finely-divided palladium component is elemental palladium, palladium oxide, a palladium/silver alloy or a mixture of any or all thereof, or a mixture of any or all thereof with finely divided silver; which palladium component, if it contains silver, will have a weight ratio of palladium/silver of at least 45:55, counting the total Pd content of all palladium-bearing constituents present, as indicated above.

As indicated, palladium-based resistor compositions have required the use of platinum-gold conductor or connector compositions, sometimes also referred to as "termination" compositions, because use of the latter completely overcomes bubbling and blistering during firing and the silver migration problem encountered with the usual silver connector compositions. However, the high cost of platinum-gold connector compositions rules out their use except in the production of a few costly and/or high precision items such as computers and the like where the added cost is not a limiting factor. The platinum-gold compositions are for too costly for use in the construction of relatively cheap consumer items such as radios, televisions and the like. Hence, a cheaper connector or termination composition is needed which will exhibit good fired-on adhesion and solder acceptance, and will eliminate the above-mentioned blister problem when used to provide fired-on connections to fired-on palladium-based resistors.

It is an object of the invention to provide improved conductive metal compositions suitable for providing conductive fired-on connections to fired-on palladium-based resistors. A particular object is to provide such conductive compositions which are relatively cheap and exhibit good fired-on adhesion and soldering properties and are not subject to bubbling or blistering when fired in contact with a palladium-based resistor. A still further object is to provide improved conductive compositions comprising finely divided palladium, silver and ceramic binder in certain critical proportions to each other, to dispersions of such compositions in an inert vehicle, and to electrically conductive elements obtained by firing such compositions onto a ceramic substrate. Still other objects will be apparent from the following description:

The improved conductor compositions of the invention contain, on a weight basis and in finely divided form, 22 to 35% palladium, 48 to 69% silver and 9 to 30% ceramic binder. The preferred proportions are 25 to 32% palladium, 52 to 60% silver and 12 to 20% ceramic binder, while the most preferred composition will contain 30% palladium, 55% silver and 15% binder.

The above palladium component of the present conductor compositions may be elemental palladium powder, palladium/silver alloy powder, palladium oxide powder (PdO) or the like, or a mixture of two or more such powders, and the Pd content of the composition as set forth in the preceding paragraph will be the sum of the Pd values for all elemental palladium, all palladium oxide and all palladium/silver alloy and the like present.

All of the palladium, silver and binder components should generally be in the finely divided or powder form. An average particle size not exceeding about 50 microns is generally satisfactory, but for the palladium and silver components, average particle sizes of 0.1 to 5.0 microns are preferred. Particle size of the binder component is not especially important and may exceed 50 microns, since the binder becomes fused during firing.

The silver and palladium component powders are readily prepared by well-known chemical precipitation or mechanical comminution methods. If a palladium/silver alloy powder is to be used, the method of pending Hoffman application, Ser. No. 258,607, filed Feb. 14, 1963, now abandoned, should be employed, since that is the only known practical method for preparing such alloy powders in sufficiently finely divided form. That Hoffman method involves the precipitation of the alloy powder from a solution of the nitrates of the two metals by means of a reducing agent such as hypophosphorous acid. It yields precipitated alloy powder of average particle size of 0.1 to 0.5 micron. The proportions of the two metals in the alloy powder is dependent upon the relative concentrations of the two metals in the nitrate solution, hence, the alloy composition may be controlled as desired by controlling the relative concentrations of the two metals in the starting nitrate solution.

The conductive compositions of the invention are those represented by the relatively small area ABCD of the three-component diagram of the drawing, while the preferred compositions are those represented by the still smaller area EFGHIJ, and point X represents the most preferred composition. The entire areas above about line YZ are in general resistor type compositions and are usually not solderable.

As to the compositions represented by the area below line YZ of the diagram of the drawing, those above line AB produce fired-on coatings having resistances too high to make them useful as conductive connectors or terminals. Those to the right of line BC in general give fired-on coatings which are not sufficiently adhesive to be useful while those to the left of line AD give fired-on coatings which either do not solder, or solder poorly. Those compositions below line DC produce, when fired either over or under a palladium-based resistor, fired-on overlap areas which are bubbly, blistered, and/or cracked and unacceptable as a contact connector. In contrast with such compositions outside area ABCD, those within that area, i.e., the compositions of the invention, when fired over or under a palladium-based resistor, give firmly adherent fired-on coatings which have good conductivity, are readily soldered and yield overlap areas entirely or essentially free of objectionable bubbles, blisters and cracks.

While most of the ceramic binders employed in previously known conductive silver compositions can be employed as the binders in the compositions of the invention, those of the $Bi_2O_3$/lead borate or lead borosilicate type (Knox U.S. Patent 2,385,580) are generally unsuited in that they result in fired coatings which frequently crack at the edges of the overlap area and often are poorly adherent. On the other hand, the $Bi_2O_3$/cadmium borate binders of my Patent 2,819,170, the $Bi_2O_3$/alkali metal-cadmium borate binders of Larsen and Short Patent 2,822,279, and the $Bi_2O_3$/lead fluoborate binders of my pending application Ser. No. 383,052, filed July 16, 1964, now U.S. Patent 3,350,341, are well suited for use in preparing the present conductive compositions.

The ceramic binders of my patent 2,819,170 consist essentially of (A) 50 to 95% $Bi_2O_3$ and (B) 5 to 50% of a cadmium borate composition, e.g., a glass frit, consisting essentially of 50 to 95% CdO, 5 to 50% $B_2O_3$ and 0 to 15% $SiO_2$.

The ceramic binders of Larsen and Short Patent 2,822,279 are generally similar to those of my above patent except that the (B) component consists essentially of 5 to 50% of an alkali metal-cadmium borate composition, e.g., glass frit, consisting essentially of 1 to 18% alkali metal oxide, 50 to 95% CdO, 5 to 50% $B_2O_3$ and 0 to 20% $SiO_2$. In the cases of the binders of both of the above patents, the preferred binders will consist essentially of 60 to 90% of component (A) and 10 to 40% of component (B). Components (A) and (B) can be simply mixed together for use, or the mixture can first be sintered or melted together, then ball-milled to the desired fineness, dried and then used. For use in formulating the conductive compositions of the present invention, the ceramic binders of Patent 2,822,279 are somewhat preferred over those of Patent 2,819,170.

The ceramic binders of U.S. Patent 3,350,341 consist essentially of 70 to 95% $Bi_2O_3$ and 5 to 30% of a lead fluoborate glass frit consisting essentially of 50 to 73% PbO, 5 to 30% $PbF_2$ and 13 to 27% $B_2O_3$. Such binders can be prepared simply by mixing together the powdered frit and the $Bi_2O_3$ in the desired proportion. Alternatively, such a mixture may be first sintered, then ball-milled; or the mixture of $Bi_2O_3$ and frit may be melted together, fritted and then ball-milled prior to use.

The conductive compositions of the invention will generally be dispersed in an inert vehicle to form a paint or paste for application to the dielectric ceramic support such as an alumina or steatite support. The proportion of the conductive composition to vehicle may vary considerably depending upon the manner in which the paint or paste is to be applied and the kind of vehicle used. Sufficient vehicle should be used to give a paint or paste of the desired consistency.

Any inert liquid may be employed as the vehicle. Examples are water and various organic solvents with and without thickening and/or stabilizing agents and the like. Examples of organic liquids that can be used are the alcohols such as methyl, ethyl, propyl, butyl and higher alcohols; esters of such alcohols, for example, the acetates and propionates; the terpenes and resins such as pine oil, alpha- and beta-terpineol and the like; and solutions of a resin such as a polymethacrylate of a lower alcohol, or of ethyl cellulose, in a solvent such as pine oil or ethylene glycol butyl ether acetate $$(butyl\text{-}O—CH_2CH_2—OOCCH_3)$$

The vehicles may contain or be composed of volatile liquids to promote fast setting after application, or they may contain waxes, thermoplastic resins or the like materials which are thermofluid so that the composition may be applied at an elevated temperature to a relatively cold ceramic substrate upon which the composition sets immediately.

Application of the conductive composition in paint or paste form to the dielectric ceramic substrate may be effected in any desired manner, e.g., to provide conductive circuit elements or connector elements. It will generally be desired, however, to effect the application in precise pattern form which can be readily done employing well-known screen stencil techniques or methods. When used to provide conductive conections to resistors, e.g., of the palladium-based type, the conductive composition may first be printed upon the dielectric ceramic substrate, e.g., alumina, the print of the resistor may be then printed over the first print so as to provide overlapping areas where electrical connections are desired, and the two prints can then be fired-on in place. Alternatively, the order of the two prints can be reversed, or one print can be applied and fired-on, after which the other print may be applied and fired-on. Firing will usually be effected at temperatures of from about 650 to 820° C. (1200 to 1500° F.) in an air atmosphere employing the usual firing lehr.

The invention is illustrated by the following examples. In the examples and elsewhere in the application, all parts and percentages of materials or components are by weight.

EXAMPLE 1

A sintered alumina wafer, one inch square, was first printed using the screen stencil technique with a conductive silver paint of the type disclosed in Larsen and Short Patent 2,822,279 containing 62.31% precipitated silver powder, 8.96% $Bi_2O_3$, 2.24% alkali metal/cadmium borate frit, 0.50% phosphorated tall oil, 0.25% diethyl oxalate and 25.74% of a vehicle consisting of 70% carbitol acetate $$(ethyl\text{-}O—(CH_2)_2—O—(CH_2)_2—OOCCH_3)$$

23% hexylene glycol and 7% ethyl cellulose (200 cps. as a 5% solution in an 80/20 mixture of toluene and ethanol at 25° C.). The alkali metal-cadmium borate frit was made by melting together 52 parts CdO, 37.5 parts borax and 10.5 parts potter's flint, fritting the resulting melt, then ball-milling, filtering and drying the frit. Its composition was 7.3% $Na_2O$, 63.1% CdO, 16.9% $B_2O_3$ and 12.7% $SiO_2$.

A resistor pattern from a palladium-based resistor composition was printed over the first print, employing the same application technique, so as to produce overlap areas between the first conductive print and the second resistor print. The resistor composition used contained 16.25% palladium powder, 16.25% silver powder and 67.5% of a zinc borosilicate glass frit. It was designed to produce a resistance of 1000 ohms per square per mil of thickness. It was applied, dispersed in a vehicle consisting of an 8% solution of ethyl cellulose (200 cps.) in beta-terpineol.

The alumina wafer with the printed patterns thereon was then fired in an air atmosphere in a continuous furnace to a peak temperature of 1275° F. for 2 minutes, requiring a 45 minute firing cycle. Severe bubbling, blistering and cracking occurred in the overlap area, i.e., the areas where the resistor print overlapped the conductive silver print, so that the resulting connection between the two prints was entirely unsatisfactory. It is further evident from the photomicrograph that the bubbling, blistering and cracking was confined to the overlap areas.

EXAMPLE 2

The procedure of Example 1 was repeated except that the conductor composition of the conductive paint used contained 30% paladium powder, 55% silver powder and 15% of a binder composed of about 80% $Bi_2O_3$ and 20% of the alkali metal-cadmium borate frit of Example 1. The conductive paint contained 74.2% of the conductor composition and 25.8% of the vehicle of Example 1. No bubbling, blistering or cracking occurred.

Results similar to those of Examples 1 and 2 were obtained when sintered steatite (instead of alumina) wafers were used.

EXAMPLE 3

Two conductor paints were prepared which were identical except for the conductor compositions used, which were 15% palladium powder, 70% silver powder and 15% ceramic binder for the first paint; and, 22% palladium powder, 63% silver powder and 15% ceramic binder for the second paint. The ceramic binder used in each was the binder used in the conductor composition of Example 2. Patterns of each paint were printed on alumina wafers, the resulting prints were superimposed with the resistor prints, and the wafers were then fired, all as indicated in Examples 1 and 2. The fired wafer prepared using the first paint showed a multitude of small blisters and a few cracks at the overlap areas, while the wafer prepared using the second paint showed only 2 small blisters and no cracks in the overlap areas. The first was judged completely unsatisfactory; the second, although not perfect, was deemed usable.

A number of palladium powder/silver powder/ceramic binder compositions were prepared whose compositions are indicated in the table below. The binder used was that described in Example 2. Prints of each composition were applied to alumina wafers, which prints, in the case of Examples 4 through 19, were over-printed with the resister paint described in Example 1, and the wafers were then fired as described in that example. In the case of Examples 20 to 30, there was no over-printing with a resistor composition before firing. The fired wafers were inspected to determine the extent of bubble formation at the overlap areas in Examples 4 to 19. The fired-on prints of the palladium/silver/binder compositions for Examples 4 to 22 to 24 were also tested for their resistances. All fired-on prints for all examples except 10 were tested for their solderability and their adhesion to the alumina substrate. The latter property was measured by determining the amount of pull (in pound) that was required to pull wire leads from the soldered films. The results were as reported in the following table.

COMPOSITION OF FIRST PRINT

| Example | Percent Pd | Percent Ag | Per ent binder | Bubble formation | Resist., ohms/sq. | Solderability | Adhesion, lbs. |
|---|---|---|---|---|---|---|---|
| 4 | 30 | 55 | 15 | None | 0.04 | Good | 13 |
| 5 | 30 | 60 | 10 | do | | do | 10 |
| 6 | 25 | 65 | 10 | do | | do | 9 |
| 7 | 25 | 60 | 15 | do | | do | 12 |
| 8 | 25 | 55 | 20 | do | | do | 10 |
| 9 | 20 | 70 | 10 | Very bad | | do | 8 |
| 10 | 20 | 65 | 15 | Poor | | | |
| 11 | 20 | 60 | 20 | Very bad | | do | 8 |
| 12 | 20 | 55 | 25 | do | | do | 10 |
| 13 | 20 | 50 | 30 | Fair | | Fair | 11 |
| 14 | 15 | 75 | 10 | Bad | | Good | 9 |
| 15 | 15 | 70 | 15 | do | | do | 6 |
| 16 | 15 | 65 | 20 | Poor | | do | 10 |
| 17 | 15 | 60 | 25 | do | | do | 9 |
| 18 | 15 | 55 | 30 | do | | Fair | 10 |
| 19 | 15 | 50 | 35 | do | | do | 10 |
| 20 | 25 | 50 | 25 | | | do | 9 |
| 21 | 30 | 50 | 20 | | | do | 10 |
| 22 | 35 | 50 | 15 | | 0.05 | Bad | 0 |
| 23 | 40 | 45 | 15 | | 0.10 | do | 0 |
| 24 | 35 | 45 | 20 | | 0.08 | do | 0 |
| 25 | 30 | 45 | 25 | | | do | 0 |
| 26 | 25 | 45 | 30 | | | Fair | 8 |
| 27 | 20 | 45 | 35 | | | Good | 7 |
| 28 | 20 | 72 | 8 | | | do | 1 |
| 29 | 30 | 62 | 8 | | | do | 2 |
| 30 | 35 | 57 | 8 | | | Poor | 3 |

As to the ratings under "Bubble Formation" in the above table, "very bad" indicates extreme bubble, blister and crack formation, such as is shown in the photomicrograph of FIG. 2; "poor" indicates bubble formation of sufficient severity to make the contact overlap areas unsuitable for practical use; "fair" indicates some bubbles but not sufficient in number or size to render the contact overlap areas unusable; while a rating of "none" indicates no bubble, blister or crack formation whatsoever. As to the resistances reported, resistances in excess of 0.05 ohms/sq. cannot generally be tolerated for conductive coatings intended for use as connectors between palladium-based resistors and other circuit elements.

Under the heading "Solderability," "bad" means either that no soldering could be effected, or that solderability was so difficult as to be unacceptable; "fair" means the fired-on coating would accept solder only with difficulty and that isolated spots might not solder, so that acceptability was borderline; while "good" means that the fired-on coating accepted solder readily to give smooth and firm soldered joints.

The adhesive property of the fired-on coatings is indicated by the amount of pull, in pounds, required to pull a wire lead from the soldered coating. Generally, the failure, i.e., separation, occurs between the fired-on film and the alumina substrate. The pull test values reported in the above table are the averages of several determinations. "Pull" values lower than 5 lbs. indicate inadequate adhesion, while values of at least 9 lbs. are generally desired.

EXAMPLE 31

A conductive composition consisting of 54.7% silver powder, 30.0% palladium powder and 15.3% of a ceramic binder was applied, dispersed in about one-third its weight of a 19% solution of n-butyl methacrylate resin (molecular weight, about 200,000) in pine oil, to an alumina wafer to provide a first print thereon as described in Example 1. The ceramic binder was a mixture consisting of 79.5% $Bi_2O_3$ and 20.5% of a glass frit having a composition approximating 78.7% CdO and 21.3% $B_2O_3$. The resulting print on the wafer was superimposed with a print of the resistor paint described in Example 1, and the wafer was then fired as described in that example. No bubbling occurred at the overlap areas during firing, and the fired-on conductive coating gave an adhesion pull test value of 8 lbs.

When the silver content of the composition for the first print was increased to 69.7% and the palladium content was decreased to 15% (the binder remaining at 15.3%), substantial bubbling occurred at the overlap areas.

EXAMPLE 32

Example 31 was repeated exactly except that the frit used with the $Bi_2O_3$ for the ceramic binder had a composition approximating 90% CdO and 10% $B_2O_3$. No bubbling occurred at the overlap area during firing and the fired-on conductive coatings gave an adhesion pull test value of 10 lbs. However, when the silver content of the composition for the first print was increased to 69.7% and the palladium content was decreased to 15%, significant bubbling occurred at the overlap areas during firing.

EXAMPLE 33

Example 31 was repeated except that the conductive composition for the first print was composed of 40 parts silver powder, 22 parts palladium powder, 13.3 parts $Bi_2O_3$ and 2.3 parts of a lead fluoborate frit composed of 65% PbO, 15% $PbF_2$ and 20% $B_2O_3$, 82.1 parts of which composition were dispersed in 17.9 parts of the butyl methacrylate resin vehicle of Example 31 for application to the wafer. Upon firing, smooth bubble-free overlap areas resulted and the fired-on conductive coating gave an adhesion pull test value of 8 lbs.

EXAMPLE 34

A composition consisting of 54.7% silver powder, 30% palladium powder and 15.3% ceramic binder was dispersed in the vehicle described in Example 1, employing 73.2 parts of the composition per 26.8 parts of the vehicle. The ceramic binder used consisted of a mixture of 79.5% $Bi_2O_3$ and 20.5% of a lead borate frit containing 82.8% PbO and 17.2% $B_2O_3$. The resulting paint was applied to an alumina wafer to provide a first print thereon, over which print was superimposed a print of the resistor composition described in Example 1, after which the wafer was fired as described in that example. Although no bubbling occurred during firing at the overlap area, cracks showed at the edges of the overlap areas and the fired-on coating from the first print gave an adhesion pull test value of only 1 lb., showing very poor adhesion.

In all the foregoing examples in which a print of a resistor composition was superimposed over a first print of a conductor composition, the resistor composition was composed of 16.25% palladium powder, 16.25% silver powder and 67.5% of a zinc borosilicate frit containing 27.7% ZnO, 8.7% $Na_2O$, 26.7% $B_2O_3$, 21.7% $SiO_2$, 3.9% CaO, 0.8% BaO, 0.7% PbO, 5.8% $Al_2O_3$ and 4.0% $ZrO_2$.

In the next two examples, resistor compositions free initially of silver (Example 35) or of elemental palladium (Example 36) were used.

EXAMPLE 35

Example 2 was repeated except that the resistor paste used in the over-printing consisted of 53.34% palladium powder, 13.33% of the zinc borosilicate glass frit described above and 33.33% of the vehicle described in Example. 1. The resulting fired wafer was free of bubbles in the overlap areas. When the same resistor paste was printed over a print of the silver conductor composition described in Example 1 (instead of over a print of the conductor composition of Example 2) substantial bubble formation occurred at the overlap areas during firing.

EXAMPLE 36

When Example 2 was repeated using as the resistor composition one containing 21.5% of a PdO/SrO pigment (containing 81.5% Pd), 10.7% precipitated silver powder and 67.8% of frit (containing 65% PbO, 10% $B_2O_3$ and 25% $SiO_2$), no bubble formation occurred at the overlap areas during firing. However, when the same resistor composition was printed over a first print of the conductive silver composition of Example 1, bubble formation was very bad at the overlap areas during firing.

EXAMPLE 37

Example 1 was repeated except that in place of the conductive silver composition there described, the first print was made using a composition comprising 25 parts PdO, 40 parts silver flake powder (prepared by milling precipitated silver powder (0.1 to 0.5 micron in diameter) with glass balls in the presence of a small amount of an alkali metal fatty acid soap), 8.9 parts $Bi_2O_3$ and 2.3 parts of the alkali metal cadmium borate binder described in Example 1. The fired wafer showed smooth, bubble-free overlap areas.

EXAMPLE 38

Resistance to loss of adhesion during prolonged immersion in a solder bath is important in a conductor or electrode coating. Alumina wafers having silver conductor coatings prepared by printing with and firing thereon the conductive silver composition described in Example 1, were compared in this respect with wafers prepared by similarly printing with and firing thereon the conductor composition described in Example 2. Various of the comparison samples were immersed in a solder bath (composition: 62% Sn, 36% Pb, 2% Ag) for times of 5, 20 and 120 seconds, after which their adhesion values were determined. The pull test results were as follows:

| Fired-on conductive coating | Solder bath immersion time, seconds | | |
|---|---|---|---|
| | 5 | 10 | 120 |
| Palladium/silver, lbs | 13 | 10 | 6 |
| Silver, lbs | 10 | 8 | 0 |

Adhesion of such fired-on coatings is also degraded by accelerated aging. The standard test is to obtain pull test values before and after heating the wafer with the fired-on coating. Results of such testing for the above fired-on palladium/silver and silver coatings are:

| Fired-on coating | Pull test values | |
|---|---|---|
| | Before aging | After aging |
| Palladium/silver, lbs | 13 | 10 |
| Silver, lbs | 10 | 7 |

EXAMPLE 39

Another property of conductive silver coatings which leads to failure of printed wiring is silver migration. This phenomenon manifests itself in the growth of a current leakage path between two conductors (which are at different potentials) when a moisture film condenses on the printed surface. The moisture film acts as electrolyte for transfer of silver ions. All electrodes containing silver are subject to failure through silver migration unless some means is devised for discharging and eliminating the hydroxyl ion that would dissolve the silver. Palladium serves this function to a limited worthwhile extent and retards but does not eliminate silver migration failure.

Alumina wafers were printed with a palladium/silver conductor composition such as that described in Example 2 so that a cathode and an anode were positioned 1/8" apart. Similar wafers were similarly printed with a silver composition such as that described in Example 1. A potential of 6 volts was applied across these patterns while drops of distilled water were allowed to bridge the gaps between the cathodes and anodes. Silver migration occurred in every instance. However, with the silver patterns, short-circuiting between the electrodes resulted in 4 to 5 minutes while with the corresponding palladium/silver patterns, the time before short-circuiting occurred varied from 15 minutes to as long as 6 hours, at approximately the same conditions.

In all of the foregoing examples, the silver, palladium or palladium oxide powders employed were of a particle size averaging about 1 micron in diameter. The $Bi_2O_3$ and/or frits employed were of particle sizes averaging about 5 microns.

When the coatings of the palladium-based resistor compositions and the coatings of the palladium-silver conductor compositions illustrated in the foregoing examples are fired-on at normal firing temperatures of 650° to 820° C. in an oxygen-containing atmosphere, e.g. air, the fired coatings will contain both elemental palladium and palladium oxide (PdO) dispersed in the matrix of the ceramic binder. The proportions of elemental palladium to palladium oxide (Pd:PdO) will depend upon various factors, the most important of which is the temperature of firing. If fired at higher temperatures, it is possible that all palladium oxide will be converted to elemental palladium.

The embodiments of the invention in which an exclusive property or privilege is claimed are as follows:

1. A composition suitable for the production of fired-on electrically conductive contacts to palladium-based resistor elements, said composition comprising (A) a substance in finely divided form from the group consisting of metallic palladium, palladium oxide and palladium/silver alloys, and mixtures of at least two thereof, said substance being present in an amount providing a Pd content of 22 to 35%, based upon the composition weight, (B) finely divided silver in an amount equal to 48 to 69% of the composition weight, and (C) a finely divided ceramic binder in an amount equal to 9 to 30% of the composition weight, said binder being from the group consisting (a) bismuth oxide/cadmium borate compositions, (b) bismuth oxide/alkali metal-cadmium borate compositions and (c) bismuth oxide/lead fluoborate frits.

2. A composition according to claim 1 having a Pd content of 25 to 32%, a silver content of 52 to 60% and a ceramic binder content of 12 to 20%.

3. A composition suitable for the production of fired-on electrically conductive contacts to a palladium-based resistor elements, said composition comprising, based upon the composition weight, about 30% finely divided palladium, about 55% finely divided silver and about 15% of a ceramic binder from the group consisting of (a) bismuth oxide/cadium borate compositions, (b) bismuth oxide/alkali metal-cadmium borate compositions and (c) bismuth oxide/lead fluoborate frits.

4. A composition according to claim 3 wherein the ceramic binder contains about 80% $Bi_2O_3$ and about 20% of an alkali metal-cadium borate frit containing about 7.3% $Na_2O$, about 63.1% CdO, about 16.9% $B_2O_3$ and about 12.7% $SiO_2$.

5. A paste composition comprising a composition in accordance with claim 1 and an inert liquid vehicle.

6. A paste composition comprising a composition in accordance with claim 2 and an inert liquid vehicle.

7. A paste composition comprising a composition in accordance with claim 3 and an inert liquid vehicle.

8. A paste composition comprising a composition in accordance with claim 4 and an inert liquid vehicle.

References Cited

UNITED STATES PATENTS

| | | | |
|---|---|---|---|
| 3,337,365 | 8/1967 | Mones | 106—1 X |
| 3,232,886 | 1/1966 | Hoffman | 252—514 |
| 3,052,573 | 9/1962 | Dumesil | 252—520 X |
| 2,924,540 | 2/1960 | D'Andrea | 252—514 X |
| 2,819,170 | 1/1958 | Short. | |

ALFRED L. LEAVITT, *Primary Examiner.*

A. M. GRIMALDI, *Assistant Examiner.*